C. A. BANGS & G. H. PIERCE.
Can Forming and Soldering Machine.
No. 224,763. Patented Feb. 24, 1880.

C. A. BANGS & G. H. PIERCE.
Can Forming and Soldering Machine.
No. 224,763. Patented Feb. 24, 1880.

Witnesses.
A. Hunswadel
Jos. P. Livermore

Inventors,
Charles A. Bangs,
George H. Pierce,
by Crosby & Gregory Attys

C. A. BANGS & G. H. PIERCE.
Can Forming and Soldering Machine.

No. 224,763. Patented Feb. 24, 1880.

Witnesses.
A. Hameswadel
Jos. P. Livermore

Inventors,
Charles A. Bangs,
George H. Pierce.
by Crosby & Gregory Atty ly rotated table, around which the devices for performing the different operations are arranged.
UNITED STATES PATENT OFFICE.

CHARLES A. BANGS AND GEORGE H. PIERCE, OF RICHMOND, QUEBEC, CANADA, ASSIGNORS OF ONE-THIRD OF THEIR RIGHT TO CHARLES E. BUTTERS, OF BOSTON, MASSACHUSETTS.

CAN FORMING AND SOLDERING MACHINE.

SPECIFICATION forming part of Letters Patent No. 224,763, dated February 24, 1880.

Application filed November 17, 1879.

*To all whom it may concern:*

Be it known that we, CHARLES A. BANGS and GEORGE H. PIERCE, of Richmond, Province of Quebec, Canada, have invented an Improvement in Can Forming and Soldering Machines, of which the following description, in connection with the accompanying drawings, is a specification.

Our invention relates to can-forming and soldering machines to be used in the manufacture of tin cans, and has for its object to produce an organized machine by which plates or sheets of tin are automatically fed from a pile to the machine, where, placed between a cylindrical mandrel and flexible formers, they are bent into cylindrical shape, and at a succeeding step the overlapped edges of the cylindrical sheet of tin are provided with solder. At the next step in the action of the machine the solder is acted upon by a solder-bolt, which melts the solder, to thereby unite the overlapped edges of the tin in the usual manner. In the succeeding action of the machine the solder is allowed time to cool and harden, and then the formers are released and removed from about the tin cylinder, and the mandrel, at the next movement of the machine, comes before the tin-feeder, to receive a new sheet of tin, when the whole series of operations is repeated. These operations are all performed automatically, and in practice are simultaneous upon different pieces or cylinders of tin upon a series of mandrels arranged about the circumference of a horizontal intermittingly-rotated table, around which the devices for performing the different operations are arranged.

Figure 1:
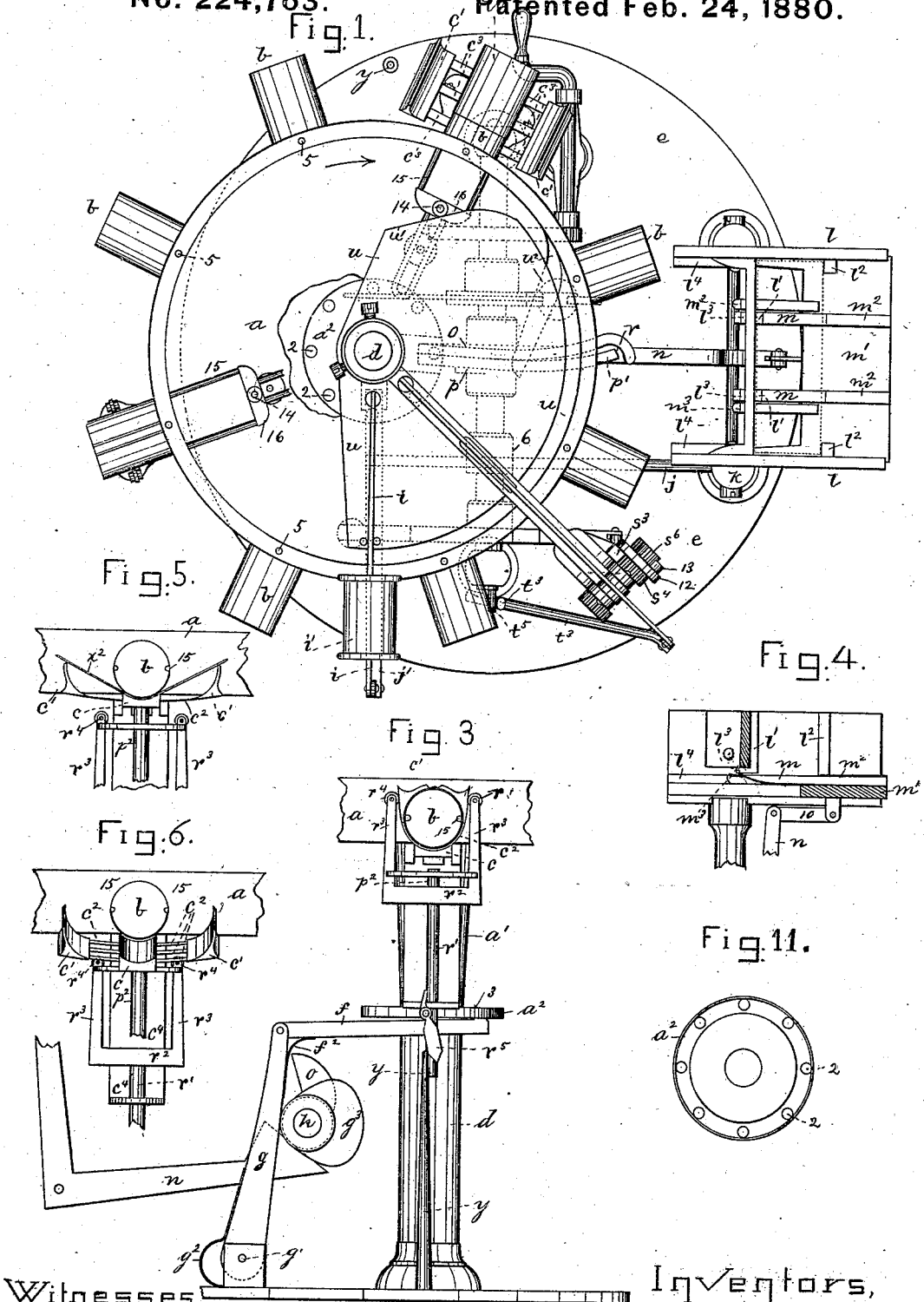
Figure 2:
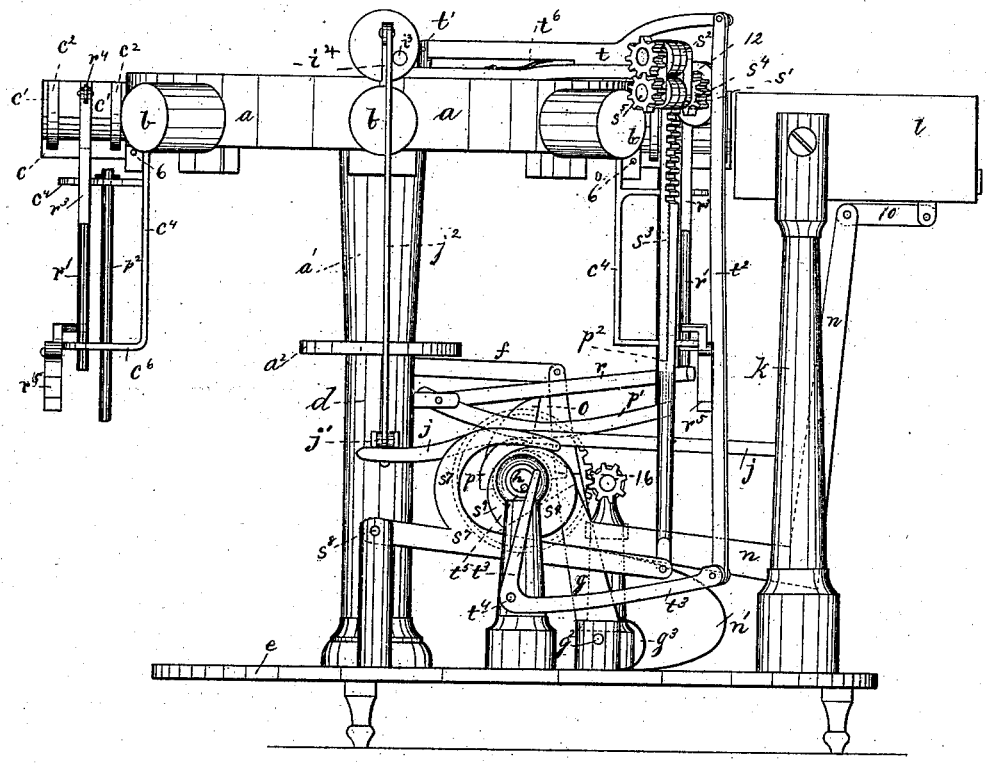
Figures 7, 8:
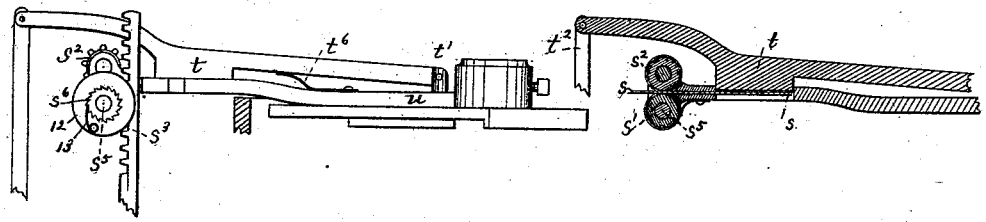
Figure 9:
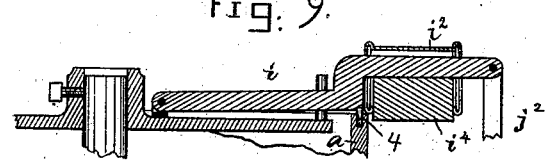
Figure 10:
Figure 12:
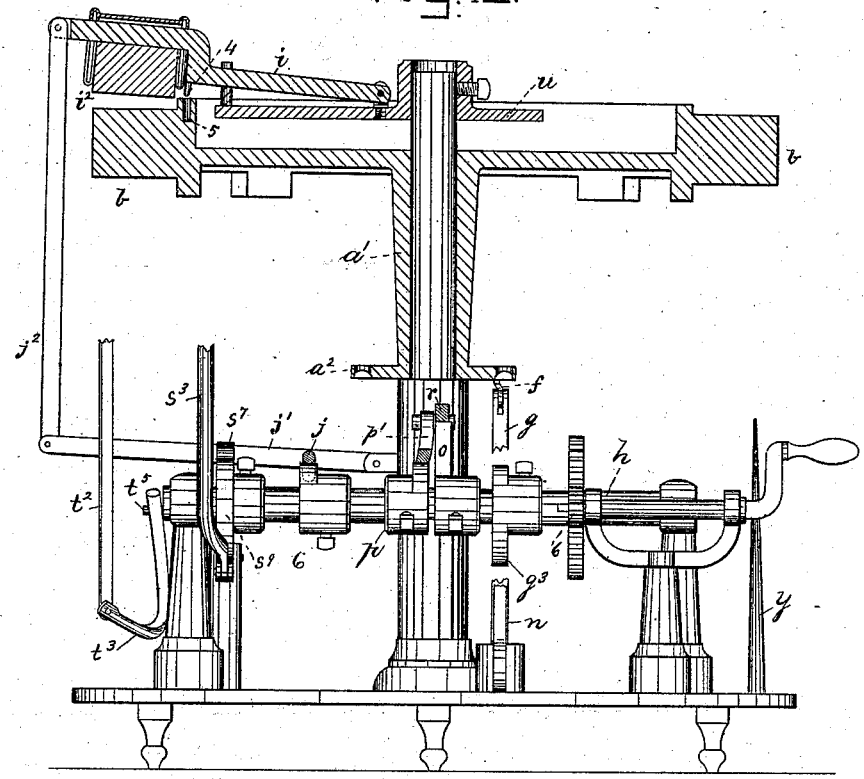

Figure 1 is a top view of our improved can-soldering machine; Fig. 2, a side view thereof; Fig. 3, an end view of a mandrel and tin cylinder, showing the mechanism about to release the flexible formers, to allow them, by their own elasticity and weight, to be removed from the formed cylinder; Fig. 4, a detail showing, in section, the mechanism for feeding the sheets of tin; Figs. 5 and 6, a detail showing end views of one of the flexible formers in its different positions; Figs. 7 and 8, side and sectional details of the solder-feeding mechanism; Figs. 9 and 10, longitudinal and cross sections of the soldering-bolt; Fig. 11, a detail to be referred to; and Fig. 12, a partial side elevation and section, showing the cam-shaft and its cams.

The table $a$, carrying the mandrels $b$ and flexible formers $c\ c'$, a part only of which are shown in the drawings, is provided with an attached sleeve, $a'$, with which it rotates about the vertical post $d$, fixed in the main supporting or bottom plate, $e$. The sleeve $a'$ is provided at its lower end with a flange, $a^2$, having holes 2, to be engaged by a projection, 3, on the arm $f$, attached to the lever $g$, pivoted at $g'$, and held up by a spring, $g^2$, against its operating-cam $g^3$ on the main cam-shaft $h$, which, supported in suitable bearings, is provided with the cams which operate the different devices at the proper time, each of the devices being operated and a complete cylinder being delivered at each revolution of said shaft $h$.

The projection 3 on the arm $f$ is inclined at its rear portion, so that in its backward movement it slips readily out of the holes 2, and does not move the table, which is then held stationary by the pin 4 (see Fig. 9) on the arm $i$, which carries the solder-bolt $i^2$, the said pin entering one of the holes 5 in the edge of the table $a$, (see Fig. 1,) thereby forming a locking device to prevent movement of the table and mandrel while the solder-bolt is operating to melt the solder.

The projection 3 is guided by a groove, $a^3$, in the under face of the flange $a^2$, (see Fig. 11,) said groove connecting the holes 2, and the projection 3 is pressed upward to engage said holes by the spring $f^2$ at the other end of the arm $f$. (See Fig. 3.)

Just before the cam $g^3$ begins to operate to rotate the table $a$ the pin 4 is raised from the hole 5 by the cam 6 on the shaft $h$, (shown in dotted lines,) said cam acting on the lever $j$, having its fulcrum in the post $k$ and connected at its other end with the arm $j'$, (shown partially in full and in dotted lines, Fig. 1,) and pivoted upon the stationary post $d$, the said arm $j'$ being connected by link $j^2$ with the solder-bolt-carrying arm $i$. The pin 4 being thus disengaged from the hole 5, the cam $g^3$, acting on arm $g$, begins to rotate the table $a$, and, the cam 6 having ceased to act, the pin 4 rests on the edge of the table $a$ until the next hole, 5, is brought beneath it, when it drops therein by the weight of the arm $i$ and solder-bolt $i'$, the solder-bolt being thus allowed to rest on the cylinder of tin beneath it, formed and supplied with solder in the manner hereinafter described.

The flat sheets of tin, of proper size and shape to form the cylinders or bodies of the cans, are placed in a pile in the feeding-box $l$, as shown in dotted lines, Fig. 1, their ends being held in position by the guides $l'$ $l^2$, the bottom of the pile resting on the bars $m$ of the reciprocating feeding-slide $m'$, held in suitable guideways in the sides of the box $l$.

The upper surfaces of the rear portions of the bars $m$, as at $m^2$, are higher than the front portions by the thickness of a single sheet of tin, and consequently, when the feeding-slide $m'$ is moved forward by the bent lever $n$ and cam $o$ and link 10, (see Fig. 3,) the higher portions $m^2$ of the bars $m$ engage the edge of the bottom sheet of the pile and push it forward, the rest of the pile being retained in position by the front guides, $l'$, a sufficient space being left between the bottoms of said front guides and the forward portion of the bars $m$ for the said single sheet of tin to pass through. The sheet of tin thus pushed forward beyond the lower ends, $l^3$, of the forward guide-pieces, $l'$, (see Fig. 4,) rests on the ledges $l^4$ of the box, the pile of tin now resting on the portion $m^2$ of the feeding-slide bars $m$.

The cam $o$ is of such shape that the slide $m'$, moved forward slowly thereby, is moved back quickly by the spring $n'$, (see Fig. 2,) which keeps the lever $n$ up to the cam $o$, and the sheet of tin is left on the ledges $l^4$, and the bottom sheet of the pile (prevented from moving back by the rear guide-pieces, $l^2$) drops upon the portion $m$ in front of the portion $m^2$, ready to be fed forward by the next movement of the slide, as just described.

When the slide $m'$ is moved backward the ends of the spring-fingers $m^3$ connected thereto rise and engage the rear edge of the sheet of tin lying on the ledges $l^4$, and at the next forward movement of the slide push said sheet $x^2$ forward between the mandrel $b$, directly in front thereof, and the flexible formers $c$ $c$, now open, as shown in Fig. 5.

The flexible formers consist of a rigid portion, $c$, concaved at its upper surface to correspond in form to the mandrel $b$, and pivoted at $6^a$ (see Fig. 2) to a suitable projection from the edge of the table $a$, to allow the forward end to drop a sufficient distance to receive the sheet of tin between it and the mandrel $b$.

The two other rigid pieces, $c'$, which constitute parts of the former, are connected by the flexible elastic strips $c^2$ with the rigid piece $c$, and are also concaved at their inner surface to correspond in form with the mandrel $b$.

Immediately after the sheet of tin $x^2$ has been left between the mandrel and formers the cam $p$ acts on the arm $p'$, pivoted to the post $d$, and causes it to raise the rod $p^2$, which brings the part $c$ of the former to the position shown in Fig. 5, and thus partially bending the tin to the desired shape, after which the cam $o$ raises the arm $r$, the end of which, curved around the end of arm $p'$, as shown in Fig. 1, acts on the rod $r'$. This rod $r'$ is provided with a cross-bar, $r^2$, having two upwardly-extended arms, $r^3$, provided at their extremities with rollers $r^4$, which, as the rod $r'$ is raised by the action of the cam $o$, act first upon the flexible strip $c^2$, to wipe them and the inclosed sheet of tin $x^2$ around the mandrel, and finally press the rigid portion $c'$ of the former up to the mandrel, as shown in Fig. 3, when the counterbalanced pawl $r^5$ engages a notch in the rod $r'$, and retains it and the formers and inclosed sheet of tin, shaped as a cylinder, in proper position while the operations of soldering are performed.

The rods $p^2$, $r'$, and pawl $r^5$ are supported and guided in a suitable frame, $c^4$, attached to the table $a$. When in this position a slight space is left between the edges of the portions $c'$, where the edges of the sheet of tin meet, and preferably overlap, a channel being thus formed, in which the solder may be deposited either in a granular state or, as herein shown, in the form of wire.

The further revolution of the cam-shaft $h$ moves the table, with the mandrel and its tin cylinder, formed and held as described, to the solder-feeding mechanism, where it is supplied with solder while the next mandrel is receiving a sheet of tin, to be formed thereon into a cylinder in the manner just described.

The solder $s$, Fig. 8, which may be of the wire form and supplied from a suitable reel, is fed forward and laid upon the edges of tin on the mandrel between the portions $c'$ $c'$ of the former by the rolls $s'$ $s^2$, actuated by the rack $s^3$ and pinion $s^4$, loose upon the axle $s^5$ of the roll $s'$.

The pinion $s^4$ has a disk provided with a pawl, 13, which slides freely over the ratchet $s^6$, fixed to the axle $s^5$ of the roll $s'$, when the rack $s^3$ moves upward, but engages said ratchet to thereby turn the rolls $s'$ $s^2$ and feed the strip of solder when the rack moves downward, the said rack being actuated positively in both directions by the double arm $s^7$, pivoted at $s^8$, and the cam $s^9$ on the shaft $h$.

After the strip of solder has been fed in above the channel formed by the portions $c'$ of the formers for a length equal to the length of the tin cylinder, the solder is cut off by the cutter $t$, pivoted at $t'$ to the cam-plate $u$, the said cutter being actuated to cut off the solder by the link $t^2$, bent lever $t^3$, pivoted at $t^4$, and eccentric pin $t^5$ on the end of the shaft $h$. The cutter $t$ is raised at the proper time, when permitted by the pin $t^5$, by the spring $t^6$.

At the next revolution of the shaft $h$, and consequent partial revolution of the table $a$, the mandrel, with the cylinder supplied with solder, as just described, is brought beneath the solder-bolt $i'$, which drops upon it, as hereinbefore described, and instantly melts the solder along the whole length of the edges of the cylinder, making it unnecessary, as heretofore commonly done, to draw the solder-bolt in the direction of the length of the edges of the tin sheet to be soldered.

The solder-bolt $i'$ consists of an outer shell, $i^2$, the function of which is to receive the heat in the form of heated air from a furnace or jets of gas burning inside said shell, a suitable inlet, $i^3$, for the heated air or gas being supplied in the shell. The tip $i^4$ thus becomes sufficiently heated by the action of hot air or gas flame without having its working-face subjected to the destructive influences thereof.

After the mandrel has passed from beneath the solder-bolt it remains undisturbed during the next two partial revolutions of the table $a$, thus allowing ample time for the solder to cool and harden, and at the next advance of the table the pin $y$, rising from plate $e$, strikes and trips the pawl $r^5$, as shown in Fig. 3, thereby releasing the rod $r'$, which drops by its own weight, and permits the flexible formers to fall into the position shown in Figs. 1 and 6, ready to again receive a new sheet of tin.

Immediately after the release of the formers from the can-body the cam-surface $u'$ of the cam-plate $u$ acts upon the roll 14 of the rods of the ejector 15, (see Fig. 1,) shown as parallel rods connected with a cross-head, 16, which push off the completed cylinder $w$, whereupon the ejector is retracted by the cam-surface $u^2$ of the cam-plate $u$ just before the mandrel arrives in front of the tin-feeding device, ready to receive a new sheet of tin, as before described.

In describing the construction and operation of the parts, we have followed a single mandrel and its sheet of tin in its progress from the point where the tin was supplied in the form of a flat sheet to that where it is delivered as a soldered complete cylinder suitable for a can-body; and it will be understood that the same operations are performed on the other mandrels (here shown as eight in number) as they, in turn, follow one another past the tin-feeding devices, a cylinder being finished and delivered at each revolution of the cam-shaft $h$, or at each step or movement of the table $a$.

The cylinder formed by this machine may be provided with heads or ends by another machine, when they will be suitable for use in canning fruit, meats, &c.

We do not desire to restrict our invention to the exact form of tin-feeding mechanism shown; nor do we claim to be the first to use a series of mandrels on a movable table, nor the first to automatically solder the cylinders or bodies formed thereon.

We claim—

1. A movable table provided with a series of mandrels and the formers or jaws to wrap the sheets of tin about the said mandrels, combined with tin-feeding mechanism, substantially as described, to feed the sheets of tin from a pile to the formers, substantially as and for the purpose set forth.

2. The former consisting of the concaved block $c$, flexible arms $c^2$, and concaved portions $c'$, connected and to operate substantially as described, combined with the mandrel and means to operate the said former.

3. The flexible former $c$ $c'$ $c^2$, combined with the mandrel and with arms to operate and close the former about the mandrel, substantially as described.

4. The mandrel and flexible formers $c$ $c'$ $c^2$, combined with the arms to close the formers about the mandrel, mechanism to operate the arms, and a locking pawl or device to keep the flexible former closed to hold the tin in cylindrical shape, substantially as described, to be soldered.

5. The combination, with the mandrel, of the flexible former, pivoted at one side near the rear of the mandrel, to drop and afford space for the easy introduction of the sheet of tin, as set forth.

6. In a can-forming machine, a mandrel, the former, and means to operate it to fold and hold a piece of tin on the mandrel to be soldered, combined with the solder-feeding mechanism to grasp and feed forward the solder-strip, and a cutter to cut from the end of the said solder-strip a piece of solder in length substantially equal to the length of the seam to be soldered, as set forth.

7. In a can-forming machine, a series of mandrels and formers, and means to operate them to fold sheets of tin around the mandrels, and mechanism to apply solder to the edges of the sheet to be joined thereby, combined with a soldering-bolt having an acting-edge of a length substantially equal to the length of the seam to be completed by the solder, and means to raise the soldering-bolt from and lower it upon the solder on the can, and a locking device to prevent movement of the table and mandrel while the soldering-bolt is operating to melt the solder, as and for the purpose set forth.

8. The outer casing, $i^2$, provided with an inlet for gas or heated air, and slotted at its lower side, the solder-bolt $i'$, having an acting-edge of substantially the length of the edges to be soldered at the side of the can, and fitted in the said casing, and arm $i$, attached to the stationary part of the machine, to hold the solder-bolt from horizontal and permit vertical movement, combined with the mandrel, formers to hold a sheet of tin thereon, as set forth, and means, substantially such as described, to raise the said soldering-bolt from and permit it to descend toward the mandrel, the combination being and operating substantially as described.

9. The mandrel upon which the can cylinder or body is formed, as described, and the former to wrap the sheet of tin about the mandrel, and mechanism, substantially as described, to release the said former at the proper time, combined with the ejector to automatically remove the soldered can-body from the mandrel, as set forth.

In testimony whereof we have signed our names to this specification in the presence of two subscribing witnesses.

CHARLES ALEXANDER BANGS.
GEORGE HENRY PIERCE.

Witnesses:
R. A. DEMTON,
A. J. BREADON.